(12) United States Patent
Sakai et al.

(10) Patent No.: US 7,357,446 B2
(45) Date of Patent: Apr. 15, 2008

(54) COWL-TOP COVER

(75) Inventors: Kazuhiro Sakai, Fujinomiya (JP); Takenori Kurata, Fuji (JP); Akihiro Ishikawa, Fujinomiya (JP); Motomu Koyama, Fuji (JP); Kazuo Matsuyama, Fuji (JP)

(73) Assignee: Nihon Plast Co., Ltd. (JP)

( * ) Notice: Subject to any disclaimer, the term of this patent is extended or adjusted under 35 U.S.C. 154(b) by 0 days.

(21) Appl. No.: 11/064,699

(22) Filed: Feb. 23, 2005

(65) Prior Publication Data

US 2006/0186704 A1  Aug. 24, 2006

(30) Foreign Application Priority Data

Feb. 25, 2004 (JP) ............................. 2004-049228

(51) Int. Cl.
*B60S 1/04* (2006.01)
(52) U.S. Cl. .................................................. 296/192
(58) Field of Classification Search ............. 296/192, 296/187.04, 187.03, 193.11
See application file for complete search history.

(56) References Cited

U.S. PATENT DOCUMENTS

| | | | | |
|---|---|---|---|---|
| 3,843,194 A | * | 10/1974 | Yamada ...................... 296/192 |
| 4,146,263 A | * | 3/1979 | Watari ........................ 296/192 |
| 4,679,845 A | * | 7/1987 | Detampel et al. ........... 296/192 |
| 4,765,672 A | | 8/1988 | Weaver |
| 4,909,566 A | * | 3/1990 | Hashimoto et al. ......... 296/192 |
| 4,943,102 A | * | 7/1990 | Hamamoto et al. ......... 296/192 |
| 5,368,620 A | * | 11/1994 | Chiba et al. .................. 96/414 |
| 5,561,882 A | * | 10/1996 | Eustache et al. ............ 296/192 |
| 5,692,953 A | * | 12/1997 | Bell et al. .................... 296/192 |
| 6,193,304 B1 | * | 2/2001 | Takahashi et al. .......... 296/192 |
| 6,193,305 B1 | * | 2/2001 | Takahashi .................... 296/192 |
| 6,322,440 B1 | * | 11/2001 | Nakatani .................... 296/192 |
| 6,565,148 B1 | * | 5/2003 | Teramoto et al. ........... 296/192 |
| 6,633,089 B2 | * | 10/2003 | Kimura ....................... 296/192 |
| 6,682,131 B2 | * | 1/2004 | Hayashi ...................... 296/192 |
| 6,920,954 B2 | * | 7/2005 | Hashimoto et al. ......... 180/274 |
| 6,923,286 B2 | * | 8/2005 | Sato et al. ................... 180/274 |
| 7,004,534 B2 | * | 2/2006 | Yoshii et al. ................ 296/192 |
| 2006/0087155 A1 | * | 4/2006 | Koyama et al. ............ 296/192 |

FOREIGN PATENT DOCUMENTS

| | | |
|---|---|---|
| JP | 2000-142474 | 5/2000 |
| JP | 2001-30955 | 2/2001 |
| JP | 2002-145021 | 5/2002 |

\* cited by examiner

*Primary Examiner*—Kiran B. Patel
(74) *Attorney, Agent, or Firm*—Kilpatrick Stockton LLP (57) ABSTRACT

A cowl-top cover for a vehicle having a bonnet hood, a windshield and a well disposed therebetween, is provided with a fixation portion fixed to a body panel of the vehicle on a side of the bonnet hood; an engaging portion including a bottom, the engaging portion being configured to conceal and slidably pinch an end portion of the windshield so that a space portion is defined by the end portion and the bottom; and a main body portion linking the fixation portion with the engaging portion and covering the well, the main body being configured to be deformed by an applied impact force and allow sliding movement of the engaging portion in a direction where the bottom moves toward the end portion of the windshield.

9 Claims, 10 Drawing Sheets

COWL-TOP COVER

BACKGROUND OF THE INVENTION

1. Field of the Invention

The present invention relates to a cowl-top cover for covering a well between a windshield and a bonnet hood of a vehicle.

2. Description of the Related Art

In a general vehicle, a well exists between a windshield and a bonnet hood thereof and is hence covered by a cowl-top cover.

Japanese Published Patent Application No. 2002-46649 discloses a related art of such a cowl-top cover, in which the cowl-top cover is formed in a closed cross section structure. In a case of where the windshield is given impact force, the closed cross section structure is deformed and further some engaging parts thereof are displaced so as to absorb the impact force. According to this art, the cowl-top cover needs to adhere to a bottom end of the windshield with any particular adhesive agent since the bottom end is easy to be exposed outward in a case where the cowl-top cover is deformed. Any teaching or suggestion that the impact force may leads to deformation or fracture of the adhering portion and be absorbed thereby cannot be found in the disclosure.

Japanese Published Patent Application No. 2001-30955 discloses another related art, in which a cowl louver is provided with a front end for being fixed to a cowl front by means of a clip and a rear end having a clip portion integrally formed therewith for elastically pinching the windshield. In this disclosure, any teaching or suggestion about deformation or fracture of the clip portion leading to absorption of impact force cannot be also found.

SUMMARY OF THE INVENTION

The present invention is intended for providing a cowl-top cover which effectively absorbs impact force though the cowl-top cover has a simple structure.

According to a first aspect of the present invention, a cowl-top cover for a vehicle having a bonnet hood, a windshield and a well disposed therebetween, is provided with a fixation portion fixed to a body panel of the vehicle on a side of the bonnet hood; an engaging portion including a bottom, the engaging portion being configured to conceal and slidably pinch an end portion of the windshield so that a space portion is defined by the end portion and the bottom; and a main body portion linking the fixation portion with the engaging portion and covering the well, the main body being configured to be deformed by an applied impact force and allow sliding movement of the engaging portion in a direction where the bottom moves toward the end portion of the windshield.

According to a second aspect of the present invention, a cowl-top cover for a vehicle, which is provided at a well between a rear end of a bonnet hood and a bottom end of a windshield of the vehicle, is provided with a fixation portion fixed to a body panel of the vehicle; a slot portion including a bottom, the slot portion configured to slidably receive and hold a marginal portion of the bottom end of the windshield and being so dimensioned as to leave a clearance between the bottom and the bottom end of the windshield; and a main body linking the fixation portion with the slot portion and covering the well, the main body being formed in a bulging shape so as to be deformable.

According to a third aspect of the present invention, a cowl-top cover for a vehicle, which is provided at a well between a rear end of a bonnet hood and a bottom end of a windshield of the vehicle, is provided with a fixation portion fixed to a body panel of the vehicle; a slot portion including a first plate portion, a second plate portion and a bottom, the slot portion configured to slidably receive and hold a marginal portion of the bottom end of the windshield, the second plate portion being configured to be deformed by an applied impact force and allow sliding movement of the windshield relative to the slot portion so as to keep the bottom end of the windshield not to be exposed outward; and a main body portion linking the fixation portion with the engaging portion and covering the well.

BRIEF DESCRIPTION OF THE DRAWINGS

FIGS. 11A through 11C are partial cross sectional views of a cowl-top cover according to a fourth embodiment of the present invention, where

FIGS. 12A and 12B are partial cross sectional views of a cowl-top cover according to a fifth embodiment of the present invention, where

DETAILED DESCRIPTION OF THE PREFERRED EMBODIMENT

The present invention will be described hereinafter by reference to certain embodiments. Throughout the description and claims, directions such as front, rear, left and right are defined and used with respect to a direction a vehicle moves in and directions such as lateral, longitudinal, upper, lower, top and bottom are defined and used with respect to a direction the vehicle normally stands.

A first embodiment of the present invention will be described hereinafter with reference to FIGS. 1A, 1B and 2.

A vehicle 1 is provided with a bonnet hood 3, as an opposite member of a cowl-top cover, for covering an engine room 2 and a windshield 5 disposed in front of a passenger's room 4. A well 6 exists below a separation between the windshield 5 and the bonnet hood 3. The cowl-top cover 11 covers the well 6 and the separation.

Figure 1A:
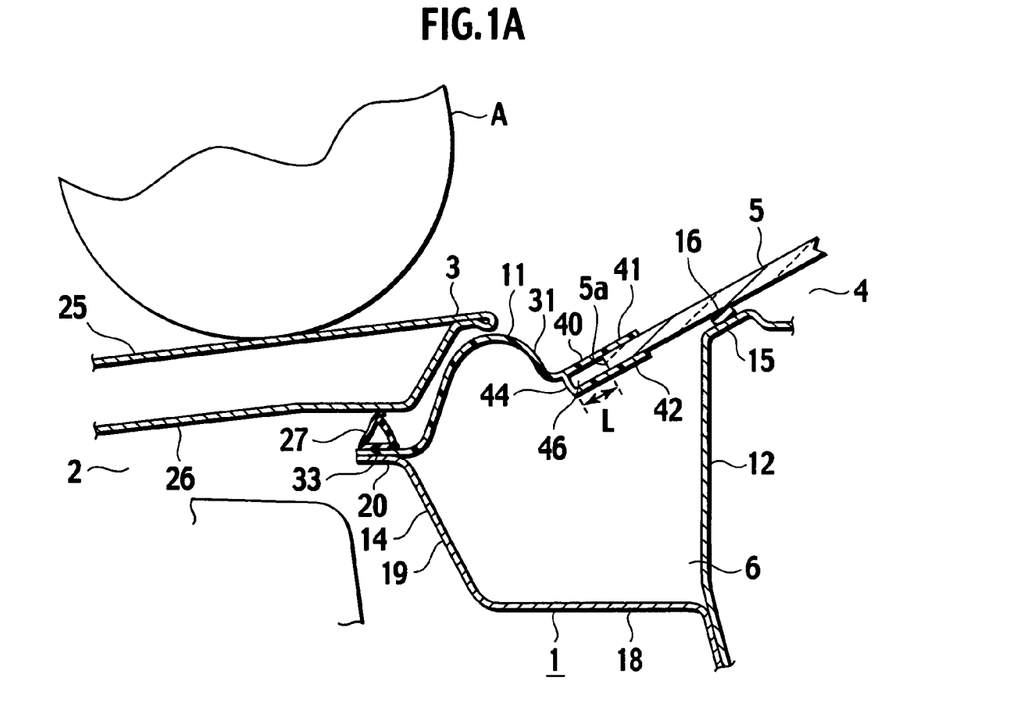
FIGS. 1A and 1B are cross sectional views of a cowl-top cover taken along a plane I-I of FIG. 2 according to a first embodiment of the present invention and respectively show states before and after receiving impact force.
Figure 1B:
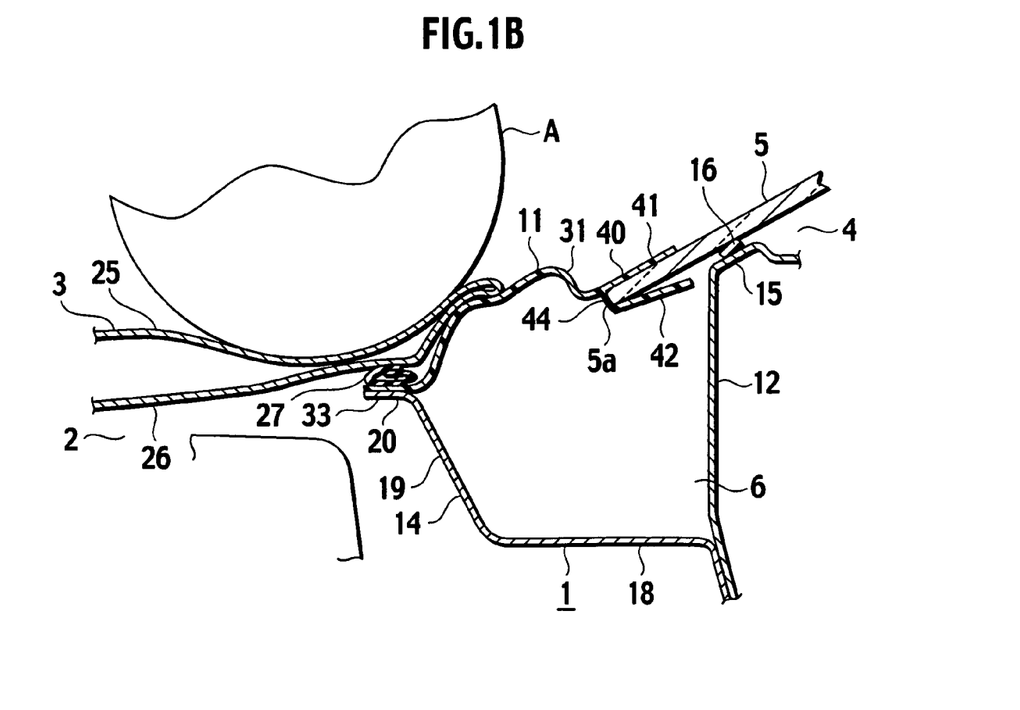
Figure 2:
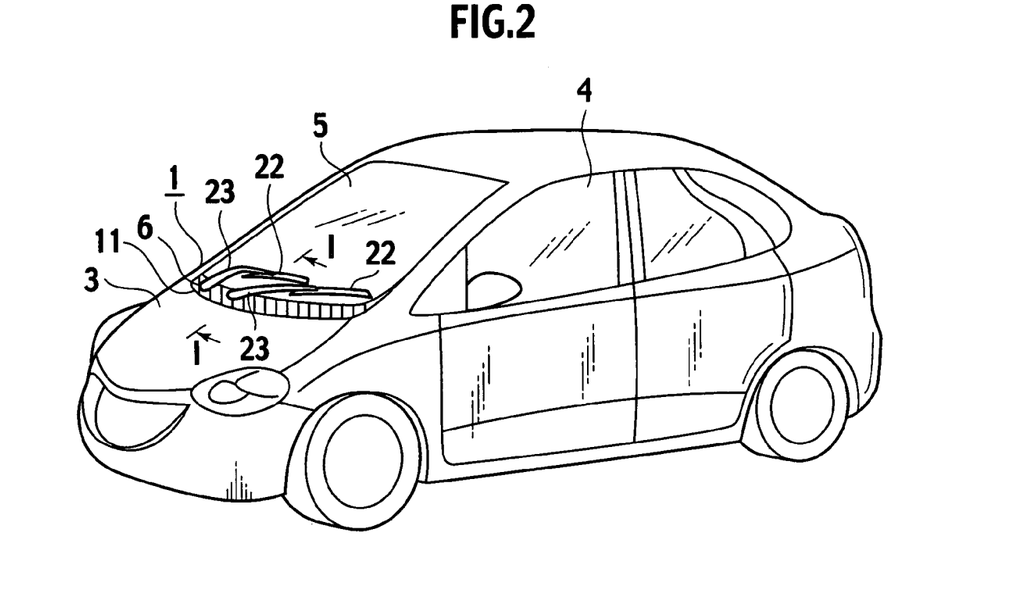
FIG. 2 is a perspective view of a vehicle to which the cowl-top cover is applied.

The well 6, alternatively called "air box", is defined by a dash panel 12 and a cowl-top panel 14, both of which are made of steel sheets as shown in FIG. 1A. The cowl-top panel 14 composes a part of a body panel of the vehicle. An upper side of the dash panel 12 is appropriately bent so as to form a windshield support 15, on which the windshield 5 is fixed by means of a sealer 16 made of any resilient watertight material such as a hot-melt adhesive. The cowl-top panel 14 is comprised of a bottom plate portion 18, a rear side of which is fixed to the dash panel 12, a front plate portion 19 extending upward and forward from the bottom plate portion 18 and a cowl-top cover support 20 extending substantially horizontally from the front plate portion 19. The well 6 houses a motor (not shown) for driving a wiper arm 23 of a wiper 22, both shown in FIG. 2.

The bonnet hood 3 is provided with a hood outer portion 25 disposed at the exterior (namely, at the upper side when the bonnet hood 3 is closed) and a hood inner portion 26 disposed at the interior (namely, at the lower side), integrally or separately.

For cutting off a gas intrusion from the engine room 2, a sealing member 27 capable of elastic deformation is disposed above the cowl-top cover support 20 of the cowl-top panel 14 with the cowl-top cover 11 put between the sealing member 27 and the cowl-top cover support 20. The sealing member 27 is in watertight contact with the bonnet hood 3 when the bonnet hood 3 is closed. The sealing member 27 is made of a rubber or a thermoplastic elastomer and adheres to the cowl-top cover 11 by means of any adhesive or such.

The cowl-top cover 11, alternatively called "cowl-cover", covers the well 6, mainly a space above the cowl-top panel 14. The cowl-top cover 11 is formed in a laterally long and longitudinally short plate shape, as shown in FIG. 2, by an injection molding from any thermoplastic resin such as polypropylene (PP), acrylonitrile butadiene styrene copolymer (ABS), polyamide series resins. The cowl-top cover 11 is provided with a cover main body 31 of a plate which bulges upward at a substantially center with respect to the longitudinal direction.

The cowl-top cover 11 is further provided with a fixation portion 33 at a front end thereof, which is formed in a substantially level plate shape and in a unitary body with the cowl-top cover 11. The fixation portion 33 has openings such as circular holes to which fixation means such as clips (not shown) are inserted and are fixed to the cowl-top panel 14 thereby.

The cowl-top cover 11 is further provided with an engaging portion 40 at a rear end thereof. The engaging portion 40 is formed as an elastically deformable slot having an opening facing rearward and extending laterally along the rear end of the main body 31. The engaging portion 40 is provided with and defined by a first plate portion 41 elongated from the main body 31, an opposite portion 44 as a bottom projecting downward and inward from the main body 31 and a second plate portion 42 elongated from the bottom 44 and extended along with the first plate portion 41. The first plate portion 41 is flush with the main body 31. A bottom end portion of the windshield 5 is inserted into the engaging portion 40. The first and second plate portions 41 and 42 are respectively in contact with outer and inner sides of the windshield 5 and hence engaged and support the windshield 5 from both sides. The engaging portion 40 is so dimensioned as to leave a space portion 46 as a clearance between an end portion 5a of the windshield 5 and the opposite portion 44 in a case where external force is not applied. A length of the space portion 46 measured from a rear end of the opposite portion 44 to a front end of the end portion 5a is predetermined to be at least 7 mm according to this embodiment. The engaging portion 40 fixes the windshield 5 in a direction perpendicular to the windshield 5 but permits relative sliding movement of the windshield 5 in a direction parallel to the windshield 5, namely contracting the space portion 46, in a case where external force is applied.

It is permitted that an elastic member is included in the space portion 46 as long as the elastic member does not interfere the relative sliding movement of the windshield 5. The space portion 46 is defined only by a dimensional relation between the end portion 5a of the windshield 5 and the opposite portion 44 and may house such an elastic member. For example, the elastic member is made of any elastic material such as foamed polyurethane and formed in an elliptic cylinder shape, a cross section of which has a major axis of 7 mm and a minor axis of 5 mm, and capable of collapsing. The present invention can be embodied as long as a clearance is held between the end portion 5a and the opposite portion 44 as the space portion 46 even if such an elastic member is included in the space portion 46.

Next, by reference to FIGS. 1A and 1B, it will be described hereinafter how the cowl-top cover 11 operates in a case where the vehicle 1 in which the cowl-top cover 11 is installed happens to collides with an object in front and thereby the cowl-top cover 11 receives external force. In the FIGS. 1A and 1B, the reference letter A refers such an object.

On the occasion of the collision, the object A goes up onto the bonnet hood 3 as shown in FIG. 1A and subsequently, as a secondary collision, deforms the bonnet hood 3. The cover main body 31 receives impact force via the deformed bonnet hood 3 and is hence deformed so as to longitudinally extend. Thereby the cover main body 31 absorbs the impact force so as to protect the object A and the windshield 5 from excessive force. Since the cover main body 31 bulges upward, the cover main body 31 is capable of relatively easy deformation in this occasion. Accompanying the deformation, the engaging portion 40 tends to be pressed toward the windshield 5, however, the relative sliding movement between the engaging portion 40 and the windshield 5 is permitted within a range of the length L with respect to the space portion 46 as described above. Thereby, the engaging portion 40 per se effectively protects the windshield 5 from excessive force. On the foregoing operations, the cowl-top cover 11 effectively protects the object A and the windshield 5 from excessive force.

In a case where the relative sliding movement between the engaging portion 40 and the wind shield 5 goes beyond the range of the length L, the opposite portion 44 abuts the end portion 5a. Then the opposite portion 5a is easy to be deformed or break so as to permit further movement of the windshield 5. Then the windshield 5 moves downward below the cowl-top cover 11 and the cowl-top cover 11 moves onto the windshield 5 relatively. Therefore the end portion 5a of the windshield 5 is prevented from being exposed outward, namely toward the object A.

As being understood from the above description, the cowl-top cover 11 effectively protects both the object A and the windshield 5 from impact force and reactive force by absorbing the forces as the deformation of the cover main body 31 and the relative sliding movement between the engaging portion 40 and the windshield 5.

Moreover, in a case where greater force is applied, the engaging portion 40 is capable of being deformed or breaking so as to permit further relative movement between the engaging portion 40 and the windshield 5 and thereby the end portion 5a of the windshield 5 is prevented from being exposed outward. The end portion 5a may not collide with the object A. Therefore, even if the object A is a pedestrian, he or she is prevented from colliding with the end portion 5a.

By the aforementioned operation, the cowl-top cover 11 effectively protects a colliding pedestrian from major damage by the secondary collision.

Meanwhile, the cowl-top cover 11 does not need to strongly adhere to the end portion 5a of the windshield 5 with any particular adhesive agent since the end portion 5a is uneasy to be exposed outward. Any strong adhesive agent is unnecessary though the structure of the cowl-top cover 11 is relatively simple.

The cowl-top cover 11 can absorb not only the impact force applied by any object going on the bonnet hood 3 but also impact force applied from the front to the bonnet hood 3 since the deformation of the cover main body 11 and the relative sliding movement between the engaging portion 40 and the windshield 5 occur in either case.

The constitution of the engaging portion 40 is not limited to the aforementioned present embodiment and modifications will occur. For example, a constitution in which the second plate portion 42 is more easily deformed as compared with the first plate portion 41 can be applied so that the windshield 5 smoothly moves downward below the cowl-top cover 11 in a case where impact force is applied.

Meanwhile, either of the deformation of the cover main body 31 and the sliding movement between the engaging portion 40 and the windshield 5 may precede or both of them may simultaneously occur.

A second embodiment of the present invention will be described hereinafter with reference to FIGS. 3 through 6. In this after-mentioned description, substantially the same elements as the aforementioned first embodiment are referenced with the same numerals and the detailed descriptions are omitted.

Figure 3:
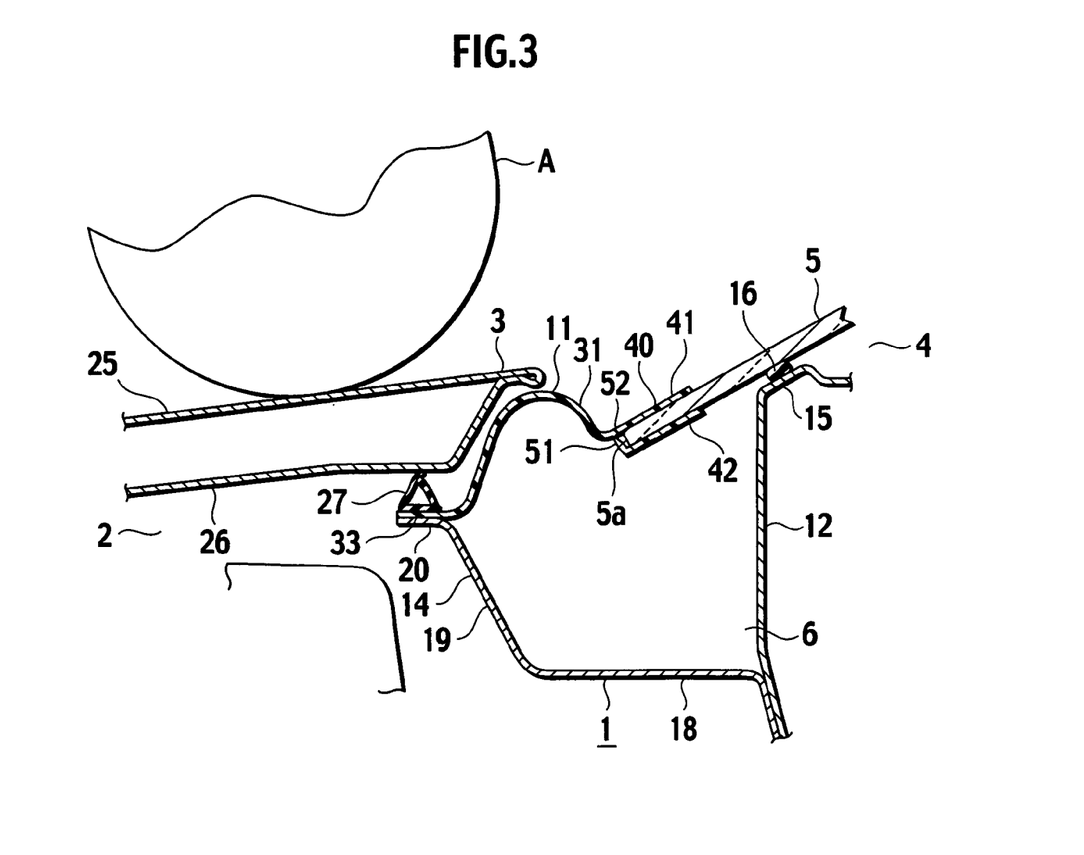
FIG. 3 is a cross sectional view of a cowl-top cover according to a second embodiment of the present invention and shows a state after receiving impact force.

An opposite portion 51 projects not perpendicularly but slantwise toward the windshield 5 from the cover main body 31. Thereby a proximal end of the second plate portion 42 is slightly disposed more rear, namely, closer to the end portion 5a of the windshield 5 than a proximal end of the first plate portion 41. Thereby width between the first plate portion 41 and the second plate portion 42 is smaller at a proximal portion thereof than at a distal portion thereof. Moreover, the opposite portion 51 has a thin wall portion 52 at a distal end thereof, where thickness of the opposite portion 51 is shaved from the interior of the engaging portion 40.

Figure 4:
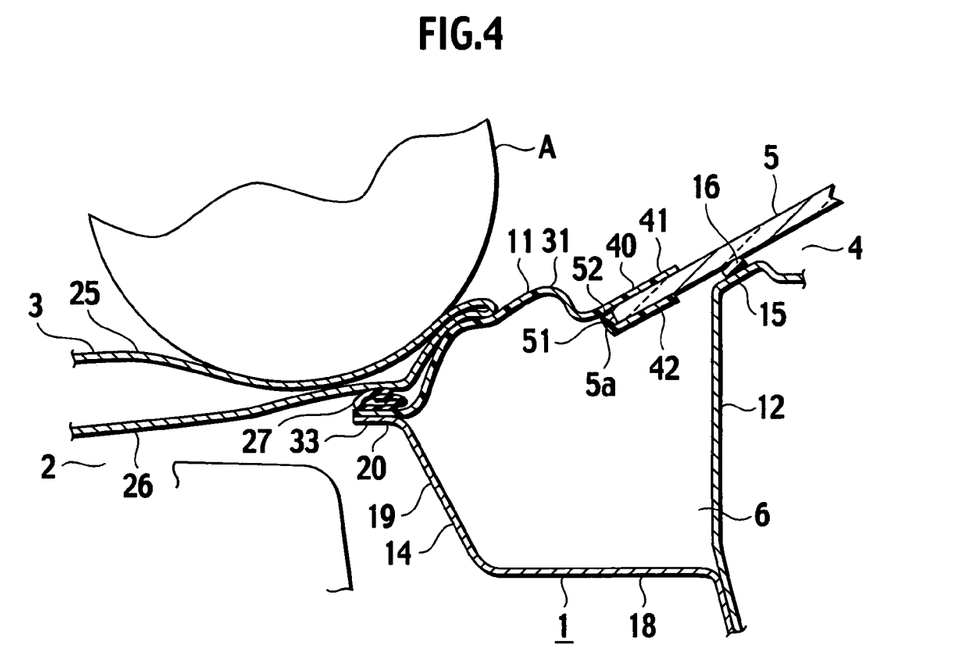
FIG. 4 is a cross sectional view of the cowl-top cover showing a state just after the state shown in FIG. 3.

In a case where impact force is applied, first the windshield 5 relatively slides into the engaging portion 40 as shown in FIG. 3 and hence the impact force is primarily absorbed. Subsequently, the cover main body 31 is deformed as shown in FIG. 4 and hence the impact force is secondarily absorbed.

Figure 5:
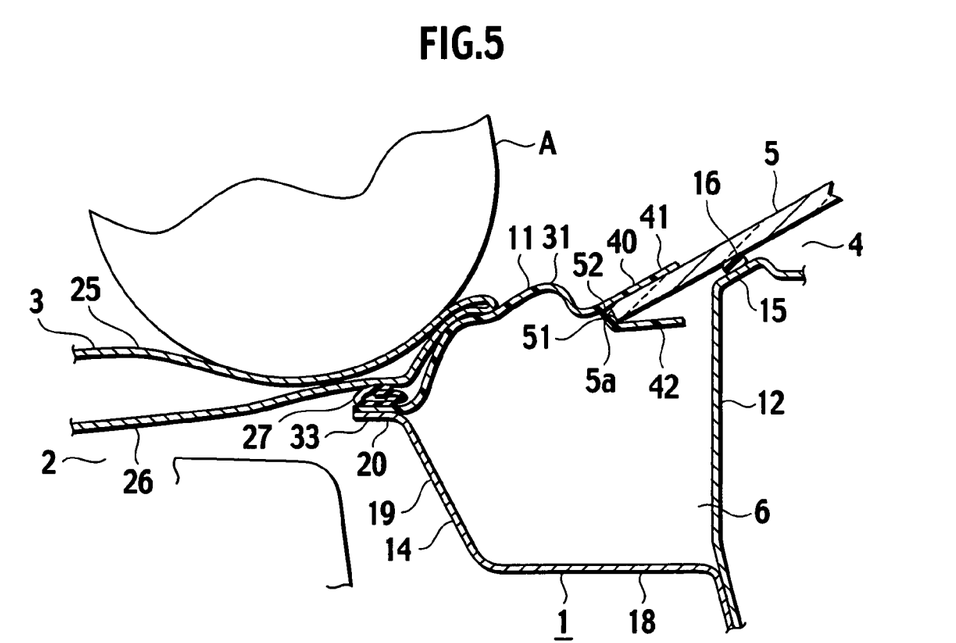
FIG. 5 is a cross sectional view of the cowl-top cover showing a state just after the state shown in FIG. 4.
Figure 6:
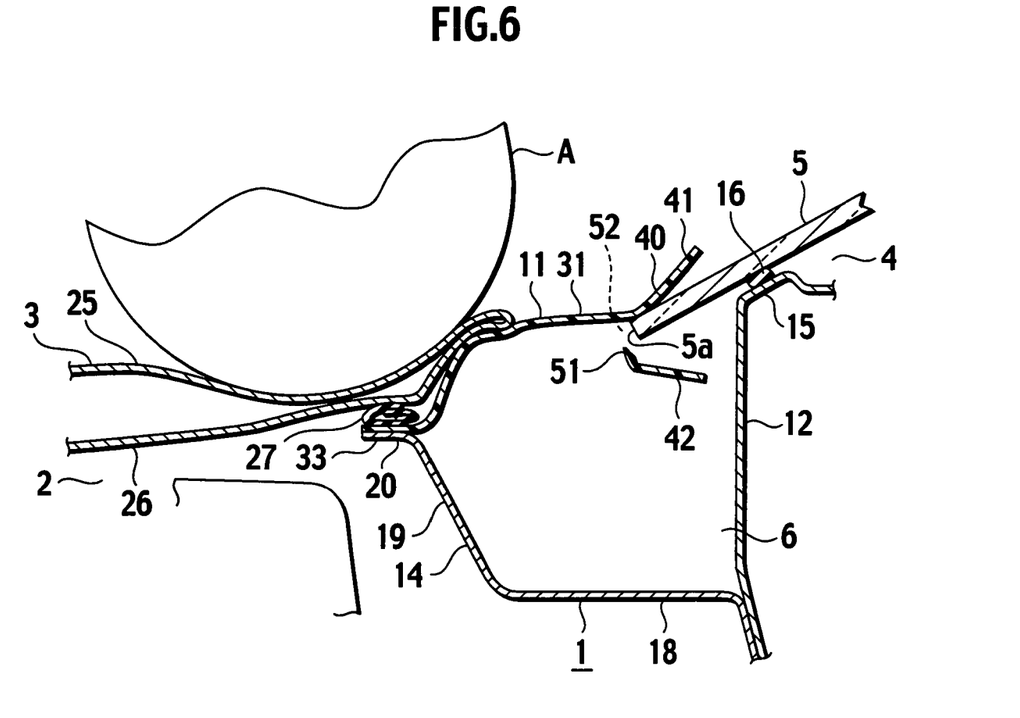
FIG. 6 is a cross sectional view of the cowl-top cover showing a state just after the state shown in FIG. 5.

Moreover, in a case where greater force beyond a range which the sliding movement between the engaging portion 40 and the windshield 5 and the deformation of the cover main body 31 can absorbs is applied, the engaging portion 40 is deformed as shown in FIG. 5 and further breaks from the thin wall portion 52 as shown in FIG. 6 so as to permit further relative movement between the engaging portion 40 and the windshield 5. In the course of breaking, first the end portion 5a of the windshield 5 abuts a spot between the opposite portion 51 and the second plate portion 42 as shown in FIG. 4 since the opposite portion 51 is inclined. Second the second plate portion 42 is deformed so as to spread as shown in FIG. 5. Then stress induced by the deformation is concentrated at the thin wall portion 52 so that breaking of the engaging portion 40 starts from not a mediate portion of the opposite portion 51 but the thin wall portion 52.

According to the present second embodiment of the present invention, the cowl-top cover 11 effectively protects a colliding pedestrian from major damage at a secondary collision since the engaging portion 40 is capable of smoothly breaking and effectively absorbs impact force.

In a condition that the engaging portion 40 breaks, the cowl-top cover 11 prevents the end portion 5a of the windshield 5 from being exposed outward so that the pedestrian is protected from damage caused by the end portion 5a. Moreover, the greater the impact is, the larger the cowl-top cover 11 covers the windshield 11. Therefore more effectively the pedestrian is protected.

The constitution of the engaging portion 40 is not limited to the aforementioned present embodiment in which the second plate portion 42 is configured to spread by means of the inclined opposite portion 51, however, modifications will occur. For example, either the opposite portion 51 or the second plate portion 42 may be provided with one or more projections or ribs for abutting the end portion 5a of the windshield 5 so as to deform the second plate portion 42 precedently. The projections or ribs may be formed in a tapered shape. Moreover, the thin wall portion 52 may be omitted.

A third embodiment of the present invention will be described hereinafter with reference to FIGS. 7 through 10. In this after-mentioned description, substantially the same elements as the aforementioned first or second embodiment are referenced with the same numerals and the detailed descriptions are omitted.

Figure 7:
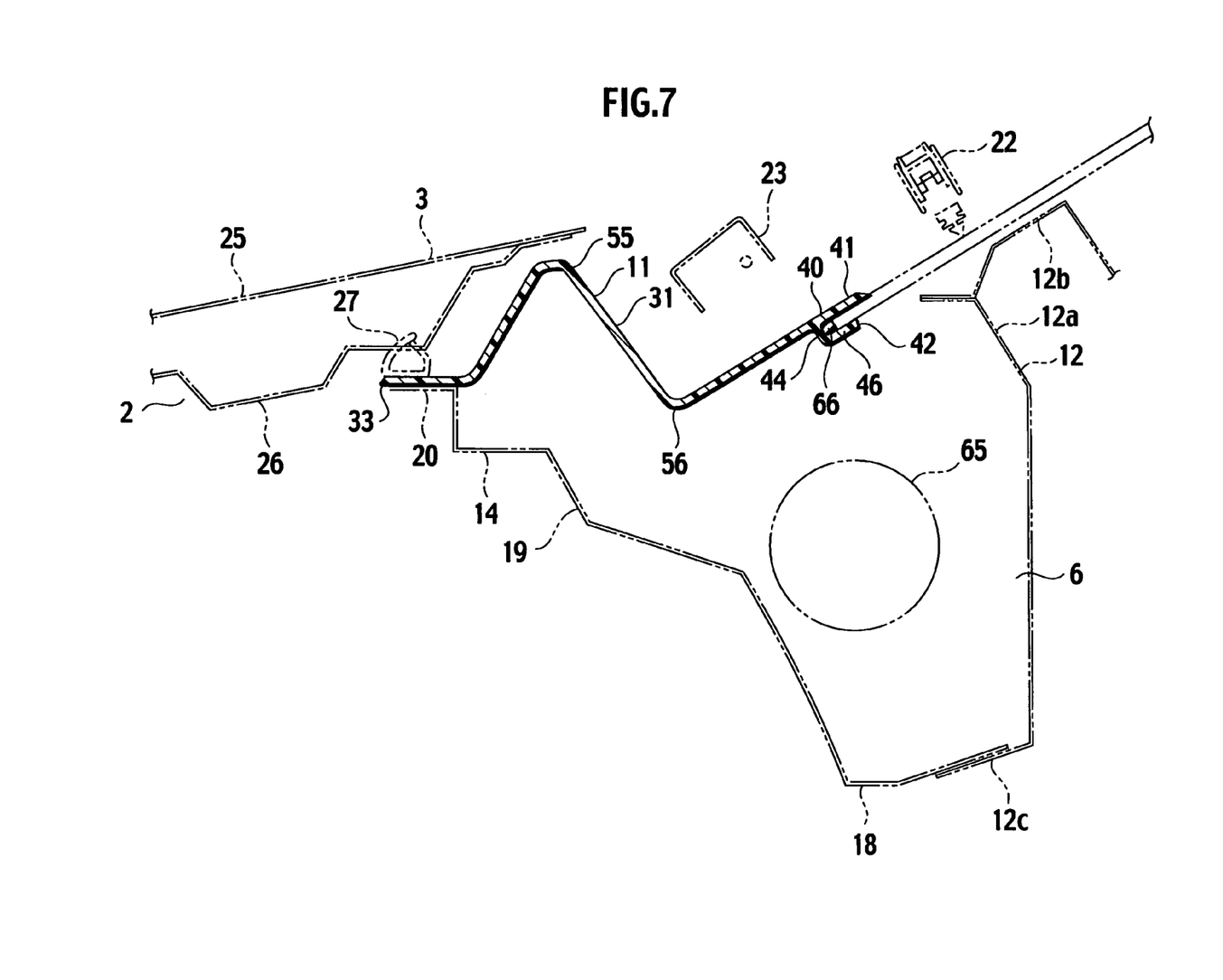
FIG. 7 is a cross sectional view of a cowl-top cover taken along a plane VII-VII of FIG. 8 according to a third embodiment of the present invention.
Figure 8:
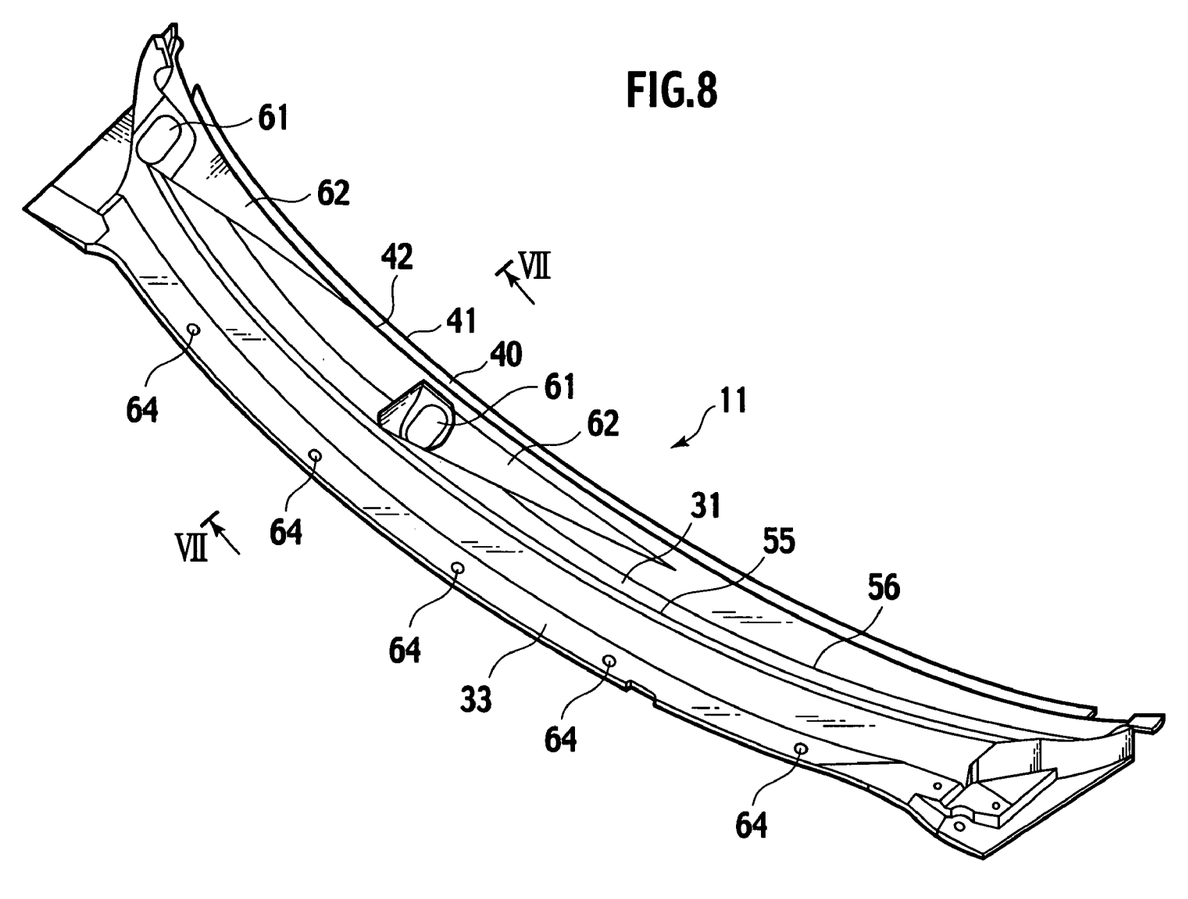
FIG. 8 is a perspective view of the cowl-top cover.

The cover main body 31 is angular and has bent portions 55 and 56 as shown in FIGS. 7 and 8. The cover main body 31 bulges upward from a vicinity of the front end over the bent portion 55 through the bent portion 56 and is straight from the bent portion 56 to the engaging portion 40. The cowl-top cover 31 is provided with a pair of openings 61 for wipers and a pair of dents 62 respectively corresponding thereto as shown in FIG. 8. The fixation portion 33 has circular openings 64 to which fixation means such as clips (not shown) are inserted. The dash panel 12 is comprised of a first member 12a and a second member 12b as shown in FIG. 7. A portion 12c extending forward and downward from the first member 12a is connected with the cowl-top panel 14. The bonnet hood 3 is provided with the hood outer portion 25 and the hood inner portion 26 separately formed and connected with each other. The well 6 houses a motor 65 for driving the wipers 22 and the wiper arms 23. The space portion 46 houses a sealing member 66.

Figure 9:
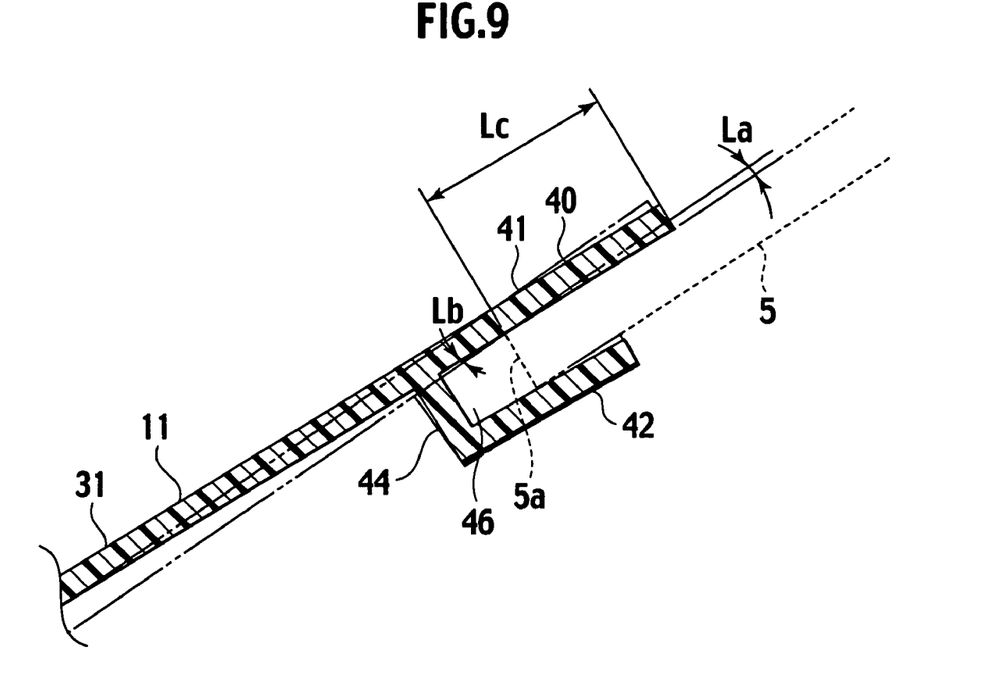
FIG. 9 is a cross sectional view of the cowl-top cover showing action thereof.
Figure 10:
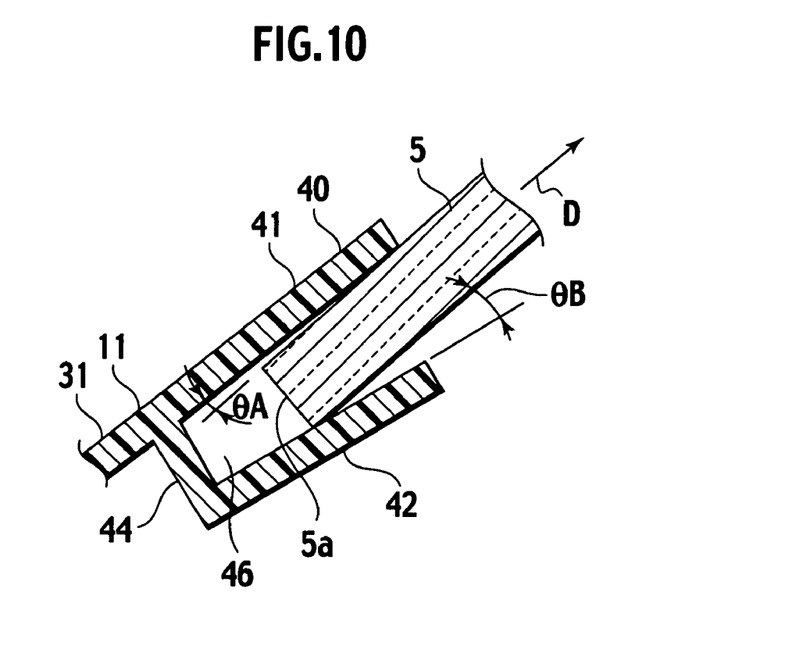
FIG. 10 is a partial cross sectional view of the cowl-top cover.

Referring now to FIGS. 9 and 10, a constitution of the engaging portion 40 will be described. The sealing member 66 is omitted from the drawings though exists. An arrows D refers a direction of sliding a mold for forming the engaging portion 40.

The first plate portion 41 and the second plate portion 42 are not parallel to the windshield 5 and respectively meet the upper and lower surfaces of the windshield 5 at angles θA and θB as shown in FIG. 10. Thereby, the first plate portion 41 is in not face-to-face but line contact with the windshield 5 at an inner corner of the distal end of the first plate portion 41. The second plate portion 42 is in line contact with the windshield 5 at an inner corner of an end of the windshield 5.

Even in a case where either or both of the cowl-top panel 14 and the windshield 5 to which the cowl-top cover 11 is installed are displaced from predetermined positions thereof at a time of running or installation thereof to the vehicle 1, for example a case where the cowl-top cover 11 swings relative to the windshield 5 in an angle θB, it is prevented to generate a gap having a width beyond La shown in FIG. 9.

Furthermore, it can be assured that a width of a gap at the distal end is kept to be near zero even if a gap having a width La comes to exist at a rear end portion in a lapping portion Lc where the cowl-top cover 11 laps over the windshield 5.

Moreover, since the engaging portion 40 is formed in a slot shape constantly along the lateral direction, the windshield 5 is capable of engaging with the engaging portion 40 along the full length thereof so that the widths La and Lb can be made smaller.

Meanwhile, the angle θA at which the upper surface of the windshield 5 meets the lower surface of the first plate portion 41 is preferably 1 degree and the angle θB at which the lower surface of the windshield 5 meets the upper surface of the second plate portion 42 is preferably 4 degree. Moreover, when the angle θA is not less than 0.5 degree and not more than 15 degree and the angle θB is not less than 3.5 degree and not more than 18 degree, the gaps between the engaging portion 40 of the cowl-top cover 11 and the windshield 5 can be minimized so that adhesiveness therebetween is assured and intrusion of the rainwater and such can be effectively suppressed.

As described above, the cowl-top cover 11 according to the present third embodiment of the present invention is capable of easily improving adhesiveness between the engaging portion 40 of the cowl-top cover 11 and the windshield 5 since the first plate portion 41 and the support plate portion 42 are set to be not parallel to the windshield 5 and to respectively meet them in a slanting condition at predetermined angles. More specifically, according to a shape which makes the first plate portion 41 and the support plate portion 42 slantwise in contact with the windshield 5 at predetermined angles, in a case where either or both of the cowl-top panel 14 and the windshield 5 are relatively displaced from predetermined positions thereof at a time of running or installation thereof, the gaps between the engaging portion 40 of the cowl-top cover 11 and the windshield 5 can be minimized so that adhesiveness therebetween can be assured and the appearance can be improved. Further, even in a case where hydraulic pressure of the rainwater flows down from the windshield, intrusion of the water into the engaging portion 40 can be effectively suppressed and the water can be smoothly conducted toward the lateral directions. More specifically, intrusion (flow) of the water into the well 6 can be suppressed.

Furthermore, since the engaging portion 40 is formed in a slot shape constantly along the lateral direction, gaps caused by fluctuation of contact surfaces between the windshield and the cowl-top cover, which may happen in a case where fixation is achieved by means of clips at predetermined intervals, and gaps between latches, which may be left in a case of a constitution by the latches formed at predetermined intervals, are not left, gaps caused by any factor aside from the cowl-top cover 11 are effectively suppressed and gaps between the cowl-top cover 11 and the windshield 5 are effectively suppressed.

Since the engaging portion 40 of the cowl-top cover 11 and the windshield 5 come to be in not face-to-face but line contact, friction therebetween is decreased and installation error is easy to be tolerant as well as the relative movement between the cowl-top cover 11 and the windshield 5 when force is applied by an impact and such can be made smooth so that the impact is relieved.

Moreover, since the shape of the engaging portion 40 is simple and the second plate portion 42 is parallel to or expanding toward the distal end, namely the opening portion, relative to the first plate portion 41, a simply constituted mold can be applied for production thereof and hence production cost can be reduced.

Still furthermore, so-called low level sound which occurs between the windshield 5 and the engaging portion 40 is suppressed since the engaging portion 40 covers the end portion 5a of the windshield 5 along the full length thereof.

Next, a fourth embodiment of the present invention will be described hereinafter with reference to FIGS. 11A through 12B. In this after-mentioned description, substantially the same elements as the aforementioned first or second embodiment are referenced with the same numerals and the detailed descriptions are omitted.

Figure 11A:
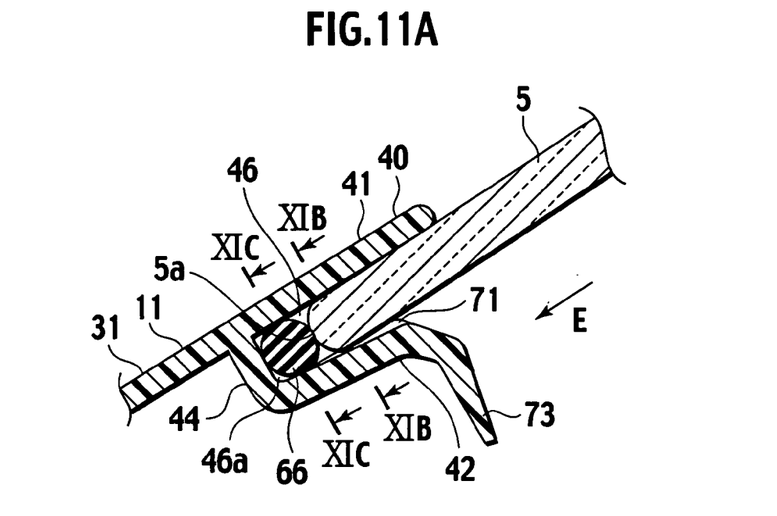
FIG. 11A shows a part of connection between the cowl-top cover and the windshield and FIGS. 11B and 11C respectively show cross sectional views taken along planes XIB-XIB and XIC-XIC of FIG. 11A.
Figure 11B:
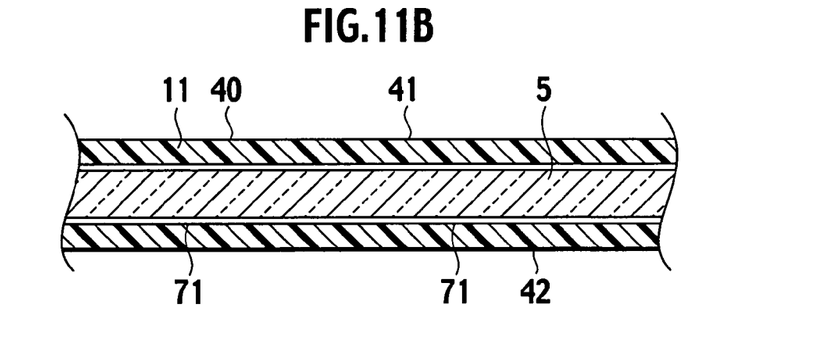
Figure 11C:
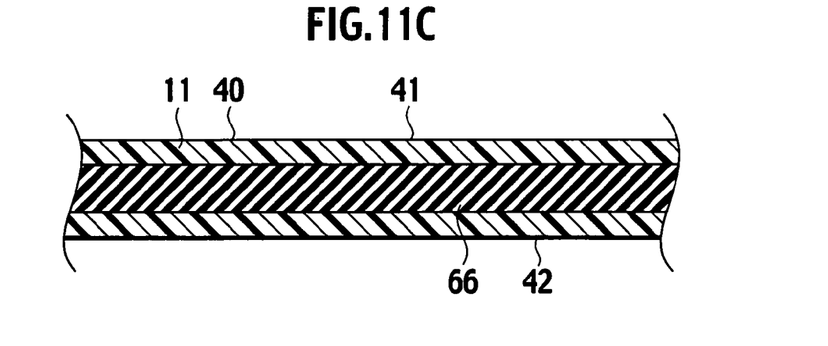

According to the present fourth embodiment of the present invention, at least either of the first plate portion 41 and the second plate portion 42 of the engaging portion 40 is provided with ribs. In a version shown in FIGS. 11A through 11C, the second plate portion 42 is provided with ribs 71 formed on the inner surface thereof at even intervals and directed along a direction E to which the windshield 5 is inserted as shown in FIG. 11A. The ribs 71 gradually decrease height thereof from the opening of the engaging portion 40, namely the rear end thereof, toward the inside, namely opposite portion 44. For example, a height of the ribs 71 is about 0.5 mm at peak and a height is 0 mm where the sealing member 66 is in contact with the second plate portion. A width of the ribs 71 is about from 1 mm to 5 mm, particularly 3 mm. The second plate portion 42 is further provided with an extending portion 73 extending downward from the rear end of the second plate portion 42.

According to the present fourth embodiment, the engaging portion 40 supports the windshield 5 by means of the ribs 71 in line contact with at least one of both the surfaces of the windshield 5, where the line is along the insertion direction, even how the angle, at which the first plate portion 41 and the second plate portion 42 meets, is, or more specifically, even if the first plate portion 41 is parallel to the second plate portion 42. Thereby the windshield 5 is easy to be inserted into the engaging portion 40.

Moreover, since the respective ribs 71 projects from the second plate portion 42 disposed lower, namely back side, and the respective ribs 71 gradually reduce its dimension toward the inside of the space portion 46, the upper, namely front, surface of the windshield 5 is in line contact with the first plate portion 41 of the engaging portion 40 without any gap along the lateral direction. As well, the columnar sealing member 66 disposed at the inside of the space portion 46 is in line contact with the first plate portion 41 and the second plate portion 42 without any gap along the lateral direction. Thereby intrusion of rainwater and dust via the space portion 46 into the well 6 is suppressed. Furthermore, a space 46a among the opposite portion 44 of the engaging portion 40, the second plate portion 42 and the sealing member 66, and such, can function as a drainpipe, namely a water flow path, so that the rainwater intruding in the space portion 46 is exhausted toward the lateral direction.

Meanwhile, for example, if the width of the ribs 71 is set about from 1 mm to 5 mm and then insertion of the windshield 5 is tight because clearance in the height direction is short, insertion may be achieved by scraping or buckling the ribs 71.

The ribs 71 can be formed either in a unitary body with or separately from the engaging portion 40.

In the any of the aforementioned embodiments of the present invention, modification may be allowed that the sealing member 66 is supported so that the sealing member 66 is not in close contact with the opposite portion 44 and thereby a space portion 46a, which functions as a drainpipe, namely a water flow path, for exhausting the rainwater intruding in the space portion 46 toward the lateral direction is assured between the sealing member 66 and the opposite portion 44.

Figure 12A:
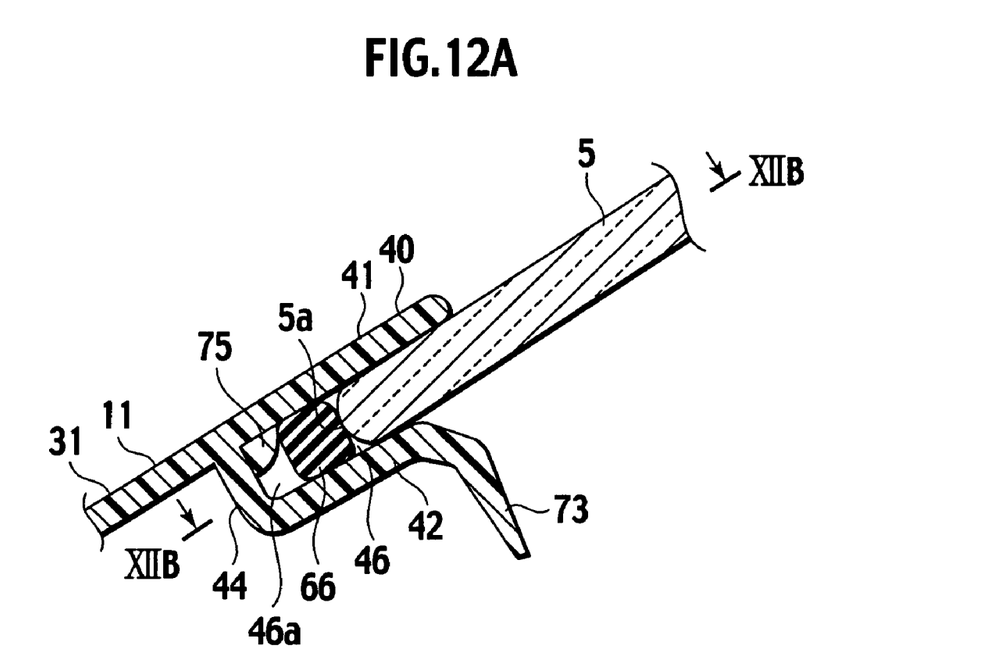
FIG. 12A shows a part of connection between the cowl-top cover and the windshield and FIG. 12B shows a cross sectional view taken along a plane XIIB-XIIB of FIG. 12A.
Figure 12B:
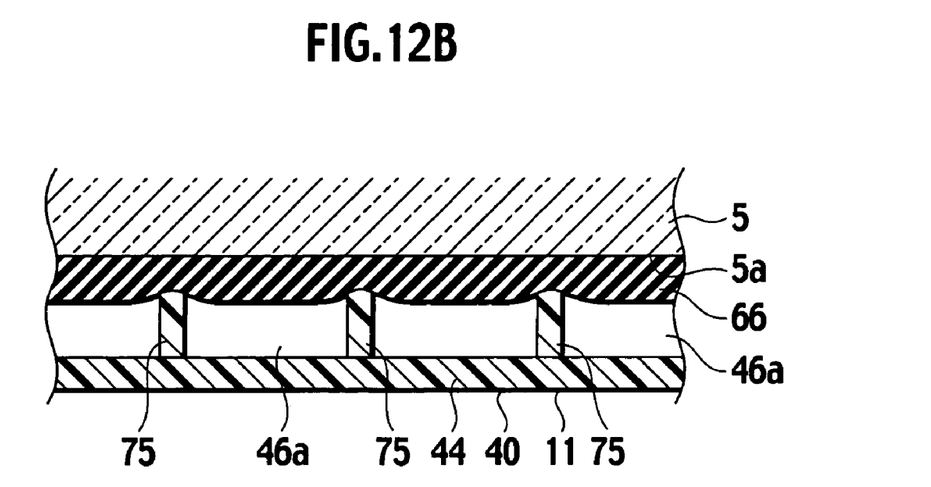

For example, as a fifth embodiment shown in FIGS. 12A and 12B, a plurality of positioning ribs 75 as projections projecting from a corner portion between the first plate portion 41 and the opposite portion 44 toward the inside of the engaging portion 40 may be provided as long as the ribs 75 do not reach the second plate portion 42.

According to the aforementioned constitution, even if the windshield 5 is pressed to the sealing member 66 because of installation error when the windshield 5 is inserted into the engaging portion 40, that the sealing member 66 is pressed to the opposite portion 44 is prevented and the space 46a at the corner between the opposite portion 44 and the second plate portion 42 is assured. Thereby the space 46a can be applied for the drainpipe for exhausting the rainwater intruding into the engaging portion 40.

The positioning ribs 75 may be formed in any appropriate shape such as projecting rails and formed in a unitary body with or separately from the engaging portion 40.

Moreover, in the descriptions of the above embodiments, the cover main body 31 of the cowl-top cover 11 is constituted to bulge upward at the middle thereof and the bonnet hood 3 covers the bulging portion, however, the cover main body 31 and such may be formed in any appropriate shape and the positional relationship of the cowl-top cover 11 and the bonnet hood 3 may be appropriately selected.

Figure 13:
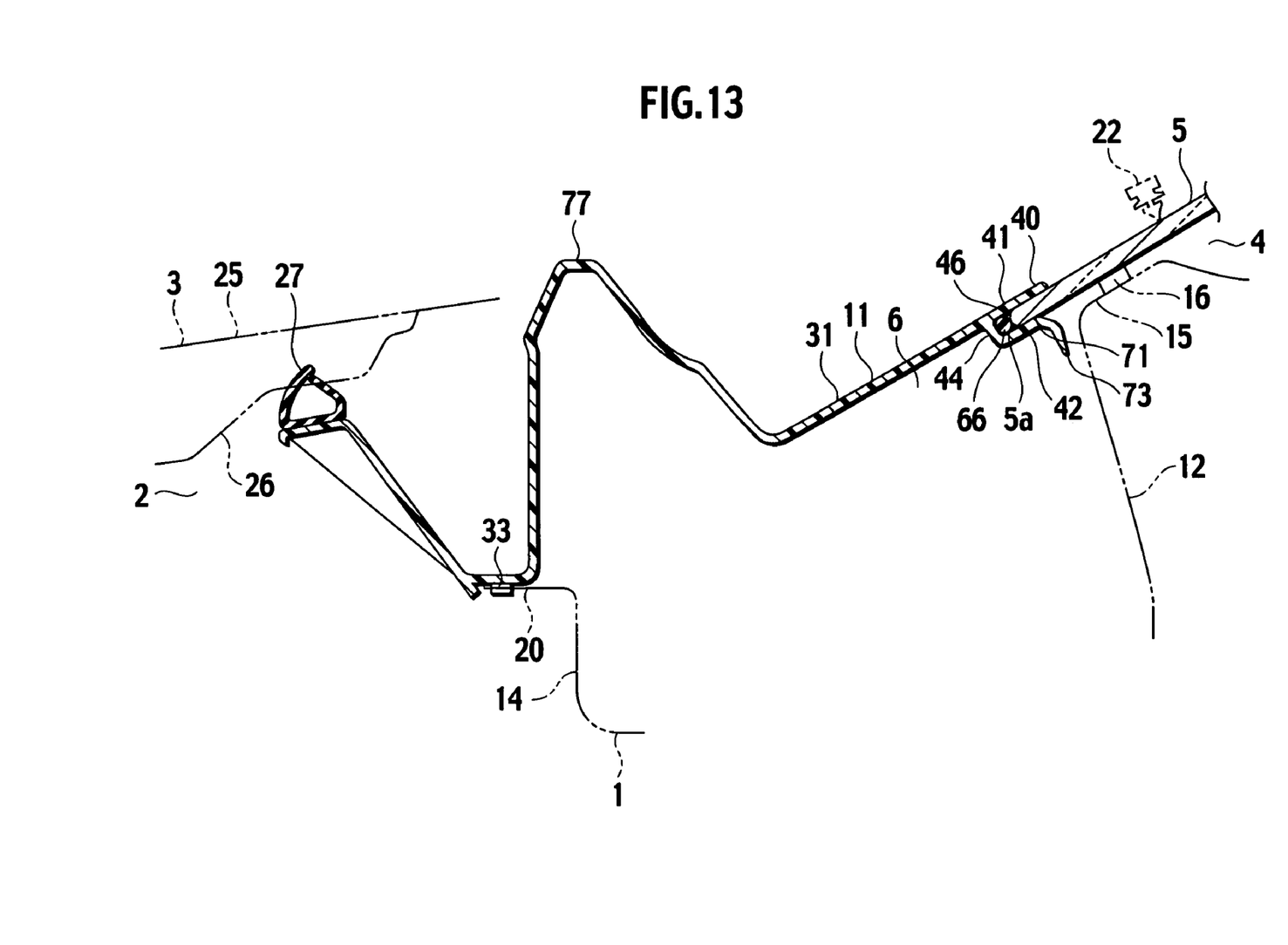
FIG. 13 is a cross sectional view of the cowl-top cover according to any of the embodiment of the present invention and shows a state that the cowl-top cover is installed in the vehicle.

For example, it may be constituted so that the bonnet hood 3 does not cover a top portion 77 of the bulging portion of the cover main body 31 as shown in FIG. 13. Moreover, in this constitution, the fixation portion 33 is provided at not the front end of the cowl-top cover 11 but a position slightly rearward from the front end portion where the sealing member 27. Even in this constitution, in a condition that force is applied from the front or force is applied to the bulging portion of the cover main body 31, absorption of impact by sliding movement between the engaging portion 40 and the windshield 5 and by deformation of the cover main body 31 is achieved so that the impact is effectively absorbed.

In any of the aforementioned embodiments, the windshield is not limited to be made of glass but made of any transparent material such as an acrylic resin.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A cowl-top cover for a vehicle having a bonnet hood, a windshield and a well disposed therebetween, the cowl-top cover comprising:

a fixation portion fixed to a body panel of the vehicle on a side of the bonnet hood;

an engaging portion including a bottom, the engaging portion being configured to conceal and slidably pinch an end portion of the windshield so that a space portion is defined by the end portion and the bottom; and a main body portion linking the fixation portion with the engaging portion and covering the well, the main body portion being deformable by an applied impact force onto the main body portion to allow sliding movement of the engaging portion to contract the space portion.

2. The cowl-top cover of claim 1, wherein the engaging portion comprises a first plate portion being in contact with an outer side of the windshield and a second plate portion being in contact with an inner side of the windshield and the second plate portion is more easily deformable with respect to the windshield when the windshield relatively slides in a direction where the space portion is contracted than the first plate portion.

3. The cowl-top cover of claim 1, wherein the engaging portion comprises a first plate portion formed as protruding from and flush with the main body portion, an opposing portion formed as protruding inward from the main body portion and a second plate portion formed as protruding from the opposite portion and extending along the first plate portion.

4. A cowl-top cover for a vehicle and being provided at a well between a rear end of a bonnet hood and a bottom end of a windshield of the vehicle, the cowl-top cover comprising:

a fixation portion fixed to a body panel of the vehicle;

a slot portion including a bottom, the slot portion configured to slidably receive and hold a marginal portion of the bottom end of the windshield and being so dimensioned as to leave a clearance between the bottom and the bottom end of the windshield to allow sliding movement of the slot portion relative to the windshield by at least a length of the clearance; and a main body portion linking the fixation portion with the slot portion and covering the well, the main body portion being formed in a bulging shape so as to be deformable to allow the sliding movement to contract the clearance.

5. The cowl-top cover of claim 4, wherein the slot portion includes a first plate portion elongated from the main body portion and a second plate portion disposed along with the first plate portion, the first plate portion and the second plate portion defining with the bottom the slot portion.

6. The cowl-top cover of claim 4, wherein the slot portion includes a first plate portion elongated from the main body portion and a second plate portion disposed along with the first plate portion, the first plate portion and the second plate portion defining with the bottom the slot portion and holding the marginal portion of the bottom end of the windshield.

7. The cowl-top cover of claim 4, further comprising a deformable sealing member housed in the slot.

8. The cowl-top cover of claim 4, wherein the slot includes a first plate portion and a second plate portion to put the marginal portion of the windshield therebetween slantwise.

9. A cowl-top cover for a vehicle and being provided at a well between a rear end of a bonnet hood and a bottom end of a windshield of the vehicle, the cowl-top cover comprising:

a fixation portion being fixed to a body panel of the vehicle;

a slot portion including a first plate portion, a second plate portion and a bottom, the slot portion configured to slidably receive and hold a marginal portion of the bottom end of the windshield, the second plate portion being configured to be deformed by an applied impact force and allow sliding movement of the windshield relative to the slot portion so as to keep the bottom end of the windshield not to be exposed outward; and a main body portion linking the fixation portion with the slot portion and covering the well, the main body portion being deformed by an applied impact force onto the main body portion to allow the sliding movement of the slot portion in a direction where the bottom moves toward the bottom end of the windshield.

* * * * *